3 Sheets—Sheet 1.

E. R. DRAVER.

CENTRIFUGAL REEL.

No. 10,696. Reissued Mar. 9, 1886.

Witnesses
R. H. Sanford.
Chas. L. James

Inventor
Emil Robert Draver
By A. C. Paul
Atty

N. PETERS. Photo-Lithographer, Washington, D. C.

3 Sheets—Sheet 2.

E. R. DRAVER.

CENTRIFUGAL REEL.

No. 10,696. Reissued Mar. 9, 1886.

Witnesses
R. H. Sanford
Chas. L. James

Inventor
Emil Robert Draver
By A. C. Paul
Atty

N. PETERS, Photo-Lithographer, Washington, D. C.

E. R. DRAVER.

CENTRIFUGAL REEL.

No. 10,696. Reissued Mar. 9, 1886.

*Witnesses*
R. H. Sanford.
Chas L. James

*Inventor*
Emil Robert Draver
By A. C. Paul
Atty.

N. PETERS. Photo-Lithographer, Washington, D. C.

UNITED STATES PATENT OFFICE.

EMIL ROBERT DRAVER, OF STILLWATER, MINNESOTA.

CENTRIFUGAL REEL.

SPECIFICATION forming part of Reissued Letters Patent No. 10,696, dated March 9, 1886.

Original No. 326,901, dated September 22, 1885. Application for reissue filed December 19, 1885. Serial No. 186,232.

*To all whom it may concern:*

Be it known that I, EMIL ROBERT DRAVER, a citizen of the United States, and a resident of Stillwater, in the county of Washington and State of Minnesota, have invented certain new and useful Improvements in Centrifugal Reels, of which the following is a specification.

This invention relates to improvements in centrifugal reels for use in treating milling products in the course of their reduction into flour, &c.; and the invention consists, generally, in the construction and the combination hereinafter described, and particularly pointed out in the claims.

Figure 1:
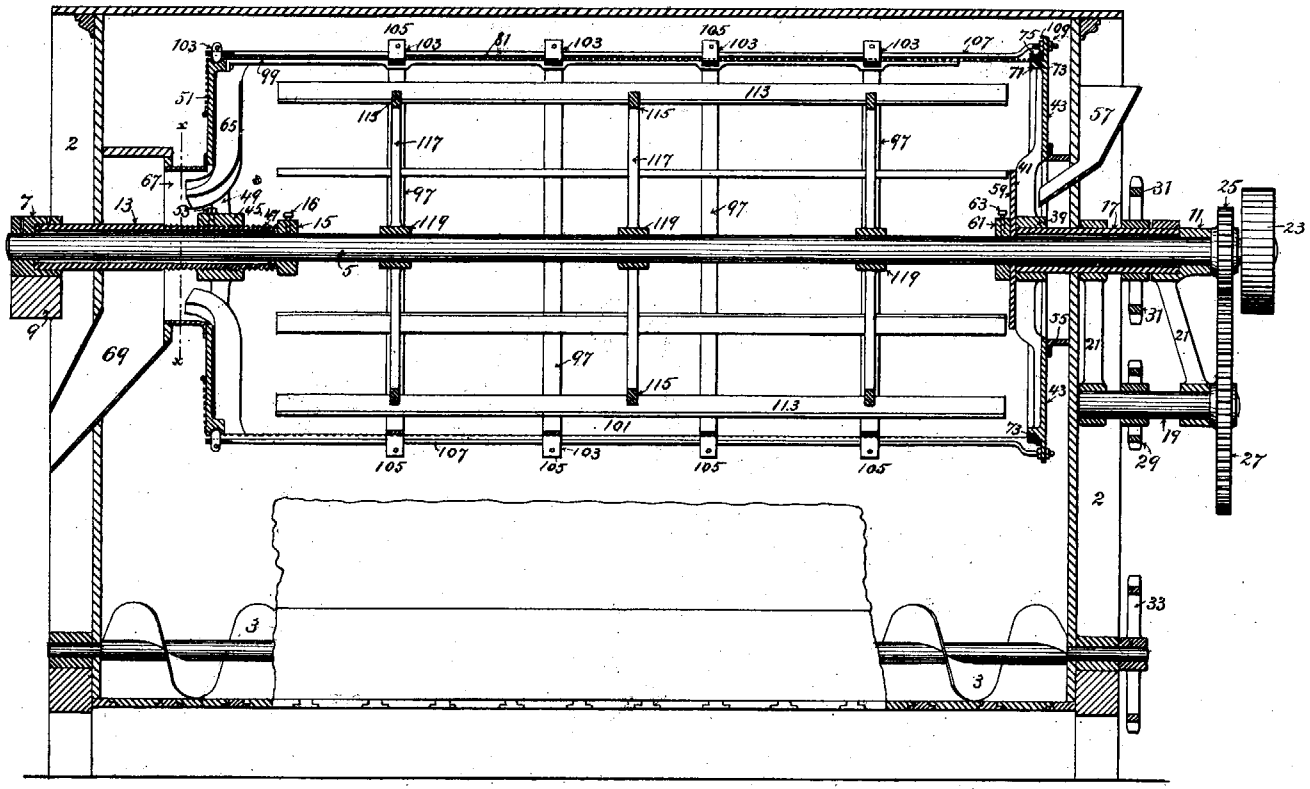
Figure 3:
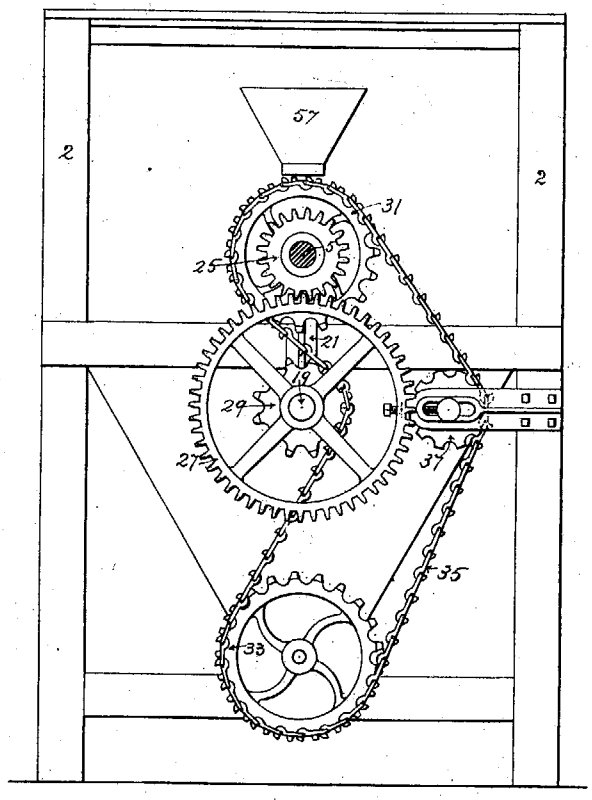
Figure 2:
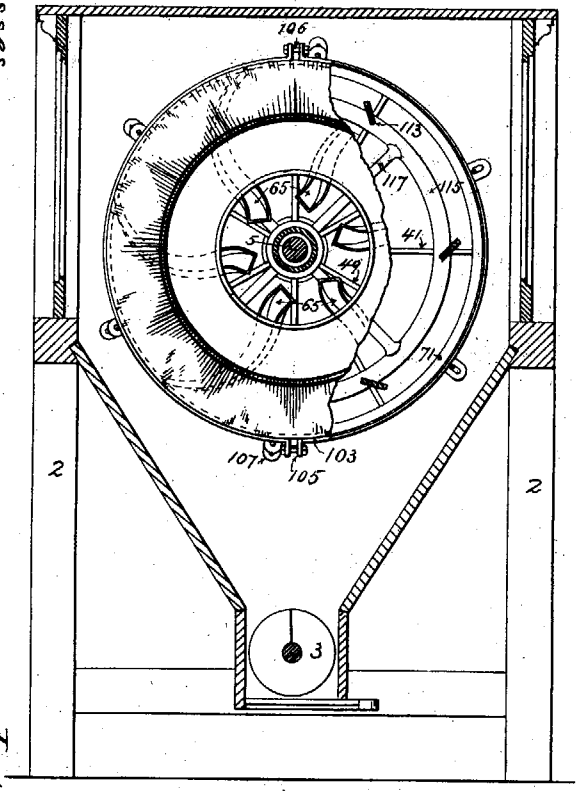
Figure 5:
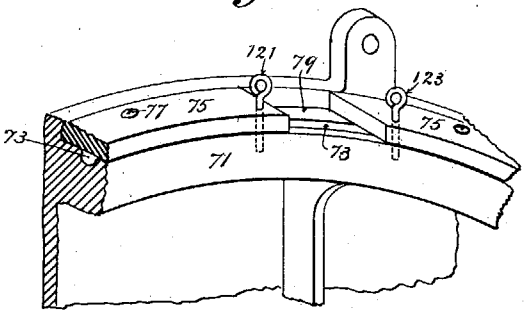
Figure 6:
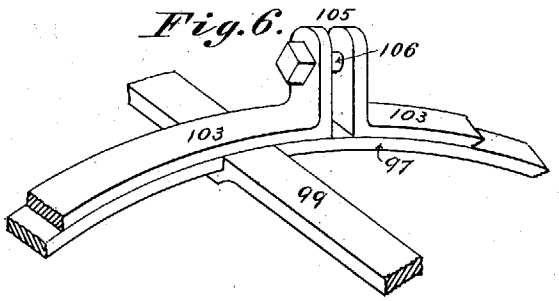
Figure 4:
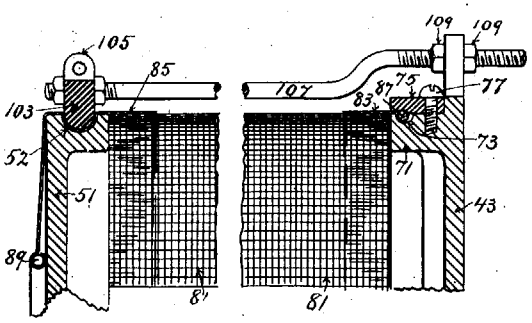

In the accompanying drawings, forming part of this specification, Figure 1 is a longitudinal sectional elevation. Fig. 2 is a cross-sectional elevation on the line *x x* of Fig. 1, and with a portion of the "head" broken away to show the interior of the reel. Fig. 3 is an outside elevation of the feed end of the machine. Fig. 4 is an enlarged detail illustrating more fully the manner of securing the bolting-cloth on the heads of the reel. Fig. 5 is an enlarged perspective view of a portion of the feed-end head of the reel, illustrating more fully the manner of securing the cloth thereto. Fig. 6 is an enlarged perspective view of a portion of the interior supporting and exterior clamping frames.

In the drawings, 2 represents the framework, of any suitable construction, and having the usual conveyer, 3, in its lower part.

5 represents the main driving-shaft, journaled at one end in a bearing, 7, on a bridge-tree, 9, and at the other end in a hanger or bridge-tree, 11.

13 is a hollow sleeve or tubular shaft encircling the shaft 5, and journaled at one end outside the casing 2 in a socket formed for it in the bearing 7, and projecting into the casing for some distance.

15 is a collar encircling the shaft 5 at the inner end of the tubular shaft 13, and adapted to be fixed to the shaft by a set-screw, 16, for bearing against the inner end of the tubular shaft and preventing an inward movement thereof. Another sleeve or tubular shaft, 17, encircles the other end of the shaft 5, and is journaled outside the casing 2 in a socket formed in the hanger 11, and passing inward through the frame, as shown. This hanger 11 will be constructed in any desired manner and attached to the casing 2 by a bridge-tree or other means, and will support a short horizontal shaft, 19, by arms 21.

On the extreme outer end of the shaft 5 is a driving-pulley, 23, through which motion is imparted to the shaft from the source of power in the mill in any suitable manner. Inside this pulley 23, on the shaft 5, is secured a pinion, 25, engaging with a gear-wheel, 27, on the counter-shaft 19, this counter-shaft being provided with a chain-pinion, 29, in line with a chain-wheel, 31, on the sleeve 17.

On the shaft of the conveyer 3, in a line below the pinion 29, is a chain-pulley, 33, around which a chain, 35, extends, and from thence around a tightener-pulley, 37, to the chain-pulley 31, fast on the sleeve 17, and thence around one side of the chain-pinion 29, fast on the shaft 19, and thence back to the conveyer-shaft. By this means the conveyer is driven from the shaft 19 by the chain 35, while at the same time, by its passage around the pulley 31, the same chain imparts motion to the reel in the same direction as the beater-shaft.

By forming the pinion 25 smaller than the gear 27 the shaft 19 runs at a slower speed than the shaft 5, and by forming the chain-wheel 31 larger than the chain-pinion 29 the reel will run slower than the beater-cylinder, but in the same direction.

A hub, 39, is fast upon the sleeve 17, inside the casing 2, and is connected by radiating arms 41 to a disk, 43, while a similar hub, 45, with an internal screw-thread, fits on a corresponding screw-thread, 47, on the sleeve 13, and is connected by radiating arms 49 to a disk, 51, the two disks respectively forming the head and tail ends of the reel. The hub 45 is adapted to be fastened to the sleeve 13 by a set-screw, 53, when required, as hereinafter set forth. An opening is made through the central portion of the disk 43, which is surrounded by a ring, 55, which closes the space between the disk and the end of the frame 2, as shown. The ring 55 may be attached to the disk 43, as shown, or to the frame 2, as preferred.

57 is the feed-spout, leading through the open center of the disk 43, as shown.

59 is a disk surrounding the shaft 5, just inside the hub 39, and held in place and secured to the shaft by a collar, 61, having a set-screw, 63, as shown, this disk serving as a stop to the inflowing material from the spout 57, and causing by its revolution to spread the material outward and throw it against the cloth just at the moment it enters the reel, and thereby insure the contact of the material with all parts of the surface of the cloth.

The disk 59 may be cast in one piece with the hub 39, if preferred.

Attached to the inner face of the disk 51 are a series of curved spouts or carriers, 65, converging toward the center, and turned outward through the central opening in the disk, as shown. A cylindrical sheet-metal ring, 67, surrounds the central opening in the disk 51, and projects toward the end of the frame 2, and is adapted to revolve with the reel in the side of the discharge-spout, as shown.

By means of the co-operation of the curved spouts 65, ring 67, and discharge-spout 69 the tailings or the material which fails to pass through the meshes of the cloth will be caught up by the spouts 65 as the reel revolves, and fed into the spout 69, the ring 67 serving to prevent these tailings from falling into the conveyer 3.

On the inner face of the disk 43 is formed a ring or annular rib, 71, having a groove, 73, in its outer edge, as shown more clearly in Figs. 4 and 5, and covered by a metal band, 75, secured to the annular rib by screws 77. This band 75 covers the groove 73, except at the ends of the bands, which do not touch, leaving an open space, 79, as shown in Fig. 5. The outer edge of the rim 71 is of less diameter than the rear part, so that a small space will be left between the band and the rim, as shown in Fig. 5, in order that the cloth or the binding may not be pinched between the band and the rim.

The groove 73 may be partially in the rim 71 and partially in the band 75, or entirely in either, as preferred.

The bolting-cloth 81 has a binding, 83 85, on each end, of ticking or other suitable material, with cords 87 89 hemmed into the edges of the bindings.

To attach the cloth to the reel, the binding at one end, 85, is inserted into the groove 73, beneath the band 75, and drawn around the rib until its end emerges again from beneath the band in the open space 79. The binding must be long enough, so that when drawn around the rib 71 its ends will meet, as will also the edges of the cloth. The cord in the binder forms a swelled edge, which will lie in the groove 73, and cannot be drawn from beneath the rib. The opposite end of the cloth is then carried over the edge of the disk forming the movable end of the reel. The binding is then drawn up by the cord to such an extent that it cannot pass back over the disk, and the ends of the cord are fastened together. The screw-threaded sleeve 13 is screwed up against the collar 15, and the movable end of the reel is thereby moved longitudinally of the shaft in a direction away from the other end of the reel. As the cloth is not attached to the movable disk, it can adjust itself evenly over the disk. Every part of the cloth will therefore be equally stretched, and no undue strain will be exerted upon any part.

In putting on the cloth of bolting-reels, where both ends of the cloth are attached to the reel ends, it often happens that some parts will be drawn a little tighter than others. Then if the reel ends are moved to stretch the cloth some parts willl be strained and often torn. By my construction and arrangement this objection is entirely obviated. One end of the reel-cloth being attached to the fixed end, the other is loosely secured over the movable end by drawing up the cord in its end. When the disk is moved, the cloth will slip around until it is evenly adjusted; or, if necessary, while being stretched the cloth may be adjusted by hand, and every part of it will be stretched alike. After the cloth has been stretched the edges are sewed or laced together in any suitable manner.

Within the reel is a cloth-supporting frame, which is attached to and moves with the movable end. This frame consists of a series of metal bands or hoops, 97, which are connected together by one or more longitudinal bars, 99, which are secured at one end to the movable reel end. This frame forms an inside support for the cloth, and as it moves with the movable end it forms no obstacle to the stretching of the cloth. I provide also a sectional clamping-frame, which is adapted to be firmly clamped over the outside of the reel, after the cloth is stretched, to securely clamp the cloth over the interior frame. This frame consists of a series of sectional hoops or bands, 103, and a series of longitudinal rods or bars, 107. The bands 103 are shown formed in two sections and provided with ears 105 and bolts 106, by which they may be fastened together. These bands may be formed in any number of sections that may be found convenient. Each section of each band is riveted or otherwise suitably fastened to one or more of the rods 107. The ends of the rods 107 are screw-threaded and provided with nuts 109, by which they are adjustably secured to the head end of the reel. The opposite disk or end, 51, has a groove in its edge, and the band on this end of the sectional frame is rounded or convex on its inner side and adapted to fit into this groove. After the cloth is stretched the sections of the clamping-frame are put in position and the ends of the sectional bands are fastened together. The nuts on the rods 107 are adjusted against the opposite faces of the head. The bands of the exterior frame are spaced equally with those of the interior frame, so that they come directly over the interior bands when in position. By this means the cloth is firmly supported and clamped at suitable intervals. The convex end band projecting into the groove in the edge of the movable disk serves to keep that disk from moving toward the other disk, and thereby retains the cloth in its stretched condition. After the cloth is stretched and the clamping-frame is in place the sleeve 13 is screwed away from the collar 15, to prevent unnecessary friction. The set-screw 46 in the hub 45 is set up against the tube 13, so that the reel and tube rotate together.

The beater-cylinder is of the ordinary construction, consisting of beater-ribs 113, attached at an angle to the cloth 81 across the rims 115 of wheels or spiders connected by arms 117 to hubs 119 on the shaft 5.

I claim a great advantage by the manner shown of constructing the cloth-covered reel without internal longitudinal ribs, except the one thin bar, 99, as the material, when thrown against the cloth by the rapidly-revolving beaters 113, strikes the cloth only, and is not obstructed by anything on the interior of the reel, the rings of the interior frame offering no obstruction, and the thinness of the bar of the frame causing the material to pass freely over it and not be affected thereby, except to a limited and immaterial extent, this bar not generally exceeding one-sixteenth of an inch in thickness.

In reels having interior longitudinal ribs the material being thrown against them glances off and strikes the cloth with accelerated speed, and always in the same place, so that the cloth thus continuously acted upon wears faster than at other portions; but with my arrangement the cloth wears evenly on all its surface, as there is nothing on the interior of the reel to cause the material to act upon it with more force at one point than at another. This form of the reel also produces a better effect upon the material, as the result sought to be obtained is the separation of the particles, and not their disintegration.

In reels having internal longitudinal ribs the material is driven against them with great force and the particles broken, which result I wish to avoid in my machine.

I prefer to provide two pins, 121 and 123, adapted to be set down through perforations in the ring or band 75, and through the binding 85 and into the rim 71. After the binding has been inserted under the band 75, these pins are put in place to hold the cloth at this end while the other end is being placed over the movable end and the longitudinal seam is being sewed or laced.

The collar 67 on the shaft 5 serves to keep the shaft from being moved through the casing by the pressure of the tubular sleeve 13 against the collar 15.

I claim as my invention—

1. The combination, in a bolting-reel with a fixed and a movable reel end, of a bolting-cloth secured to the fixed reel end, passing over the edge of the movable reel end, and having its end contracted around the face thereof, and means for moving said reel end, substantially as described, and for the purpose set forth.

2. The combination, in a flour-bolt, of a fixed head or reel end, a movable reel end, means for moving said end toward or from the fixed end, and a bolting-cloth attached to the fixed reel end and turned over and contracted around the outer face of the movable end, but unattached to said end, substantially as and for the purpose set forth.

3. In a bolting-reel, the combination of a fixed reel end, a movable reel end, a bolting-cloth secured to said ends, an interior cloth-supporting frame attached at one end to and carried by said movable end and unattached at its opposite end, and means for moving said reel end, all substantially as described.

4. In a bolting-reel, the combination, with the reel end 43, and the movable end 51, having the groove 52 in its edge, of the bolting-cloth secured upon said ends, the exterior clamping-frame having the convex band fitting the groove 52, the rods 107 with the threaded ends, and the adjusting-nuts, whereby said clamping-frame is adjustably secured to the fixed reel end, all substantially as and for the purpose set forth.

5. The combination, in a bolting-reel, of a fixed reel end, a movable reel end, a bolting-cloth, an exterior clamping-frame consisting of a series of longitudinal bars, a series of hoops, each formed in two or more sections, clamps for securing one end of said frame to said movable reel end, and means for adjustably securing the opposite end of the frame to the fixed reel end, substantially as described.

6. In a bolting-reel, the combination, with the fixed reel end having the projecting lugs and the movable reel end having a groove in its edge, of the bolting-cloth, the interior cloth-supporting frame attached to and moving with said movable end, the exterior clamping-frame having a convex band fitting the groove in the movable end, and threaded rods and nuts for adjustably securing one end of said frame to the lugs on the fixed reel end, substantially as described.

7. The combination, in a centrifugal bolting-reel, with the main shaft and the collar 15, of the fixed end 43, the movable end 51, having the threaded hub 45, the threaded tube 13, the bolting-cloth, and means, as described, for securing said cloth upon said ends, all substantially as and for the purpose set forth.

8. The combination, in a centrifugal reel, with the beater-shaft and beaters, of the tubular shafts or sleeves surrounding said beater-shaft at the ends of the reel, collars on said beater-shaft for preventing said sleeves from moving toward each other, reel ends mounted on said sleeves, a bolting-cloth secured upon said reel ends, and means for moving one of said ends lengthwise on its sleeve, all substantially as set forth.

9. In a centrifugal separator, the combination of a frame-work, a horizontal shaft, a beater-cylinder adapted to be rapidly revolved, a pinion, 25, on said shaft, a bolting-cloth-covered reel surrounding said beater-cylinder, tubular shafts or sleeves 13 17, by which it is journaled concentrically around said shaft and beater-cylinder, chain-pulley 31, fast on sleeve 17, counter-shaft 19, gear-wheel 27, engaging pinion 25, chain-pinion 29 on said counter-shaft, chain-wheel 33, the conveyer-shaft, tightener 37, and chain 35, substantially as described.

In testimony whereof I have hereunto set my hand this 11th day of December, 1885.

EMIL ROBERT DRAVER.

In presence of—
H. C. DRAVER, Jr.,
A. C. PAUL.